Figure 6:
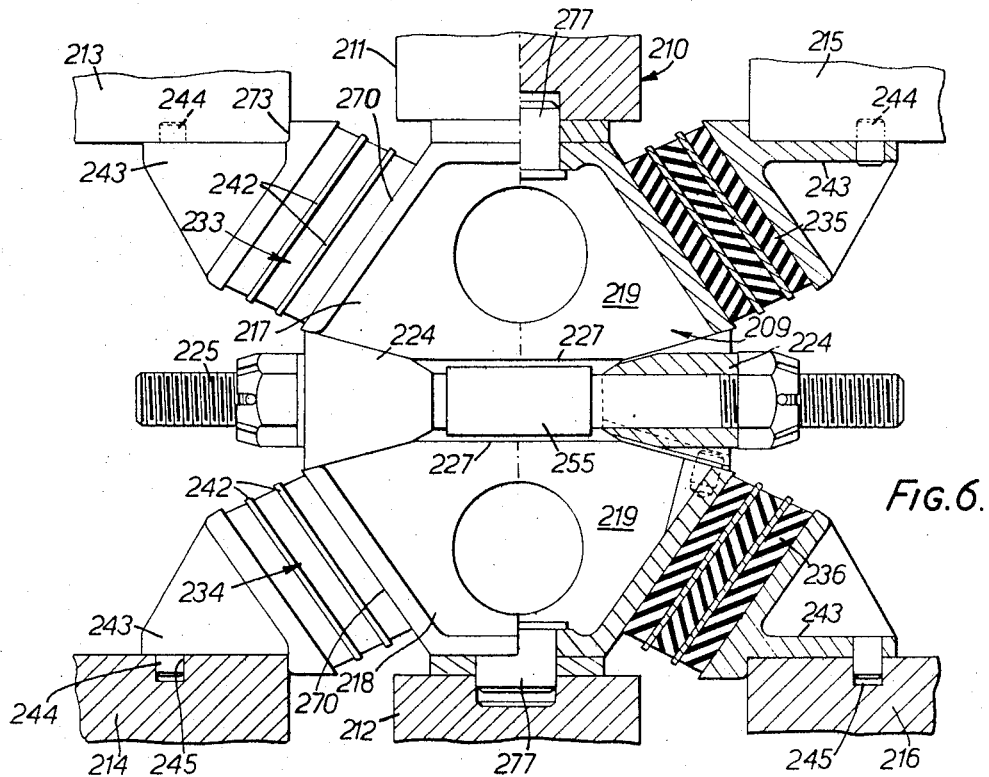

March 29, 1966  A. J. HIRST ETAL  3,242,877
SUSPENSION ARRANGEMENTS FOR TRACTION MOTORS OF RAILWAY VEHICLES
Filed Sept. 9, 1964  7 Sheets-Sheet 1
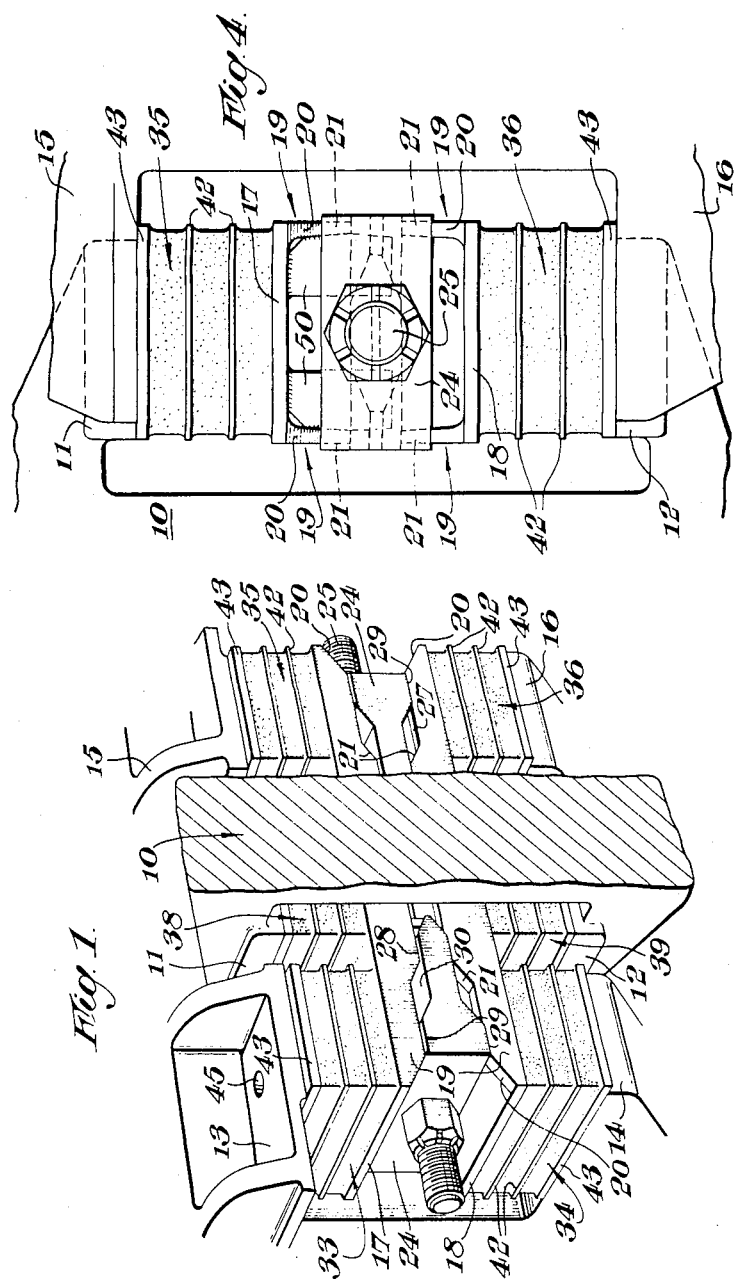
INVENTORS
ARCHIE JOHN HIRST
KENNETH JOHN BENJAMIN CLARK
BY
ATTORNEY

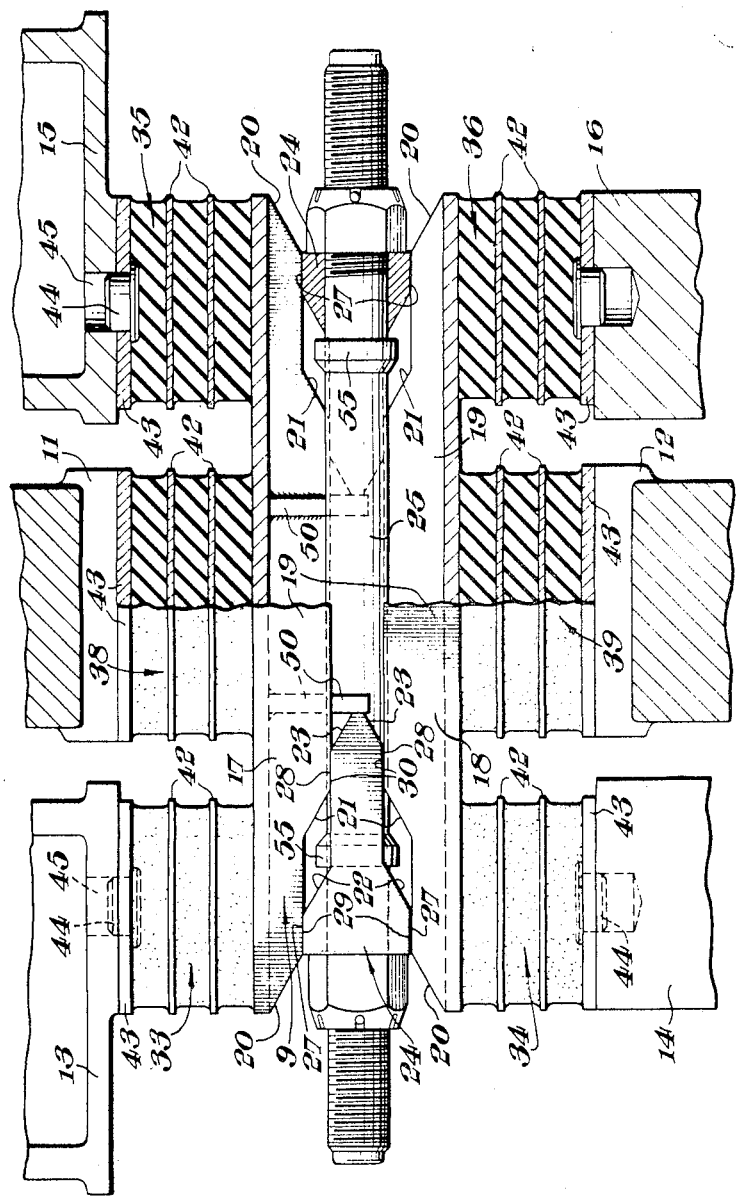

March 29, 1966    A. J. HIRST ETAL    3,242,877
SUSPENSION ARRANGEMENTS FOR TRACTION MOTORS OF RAILWAY VEHICLES
Filed Sept. 9, 1964    7 Sheets-Sheet 3
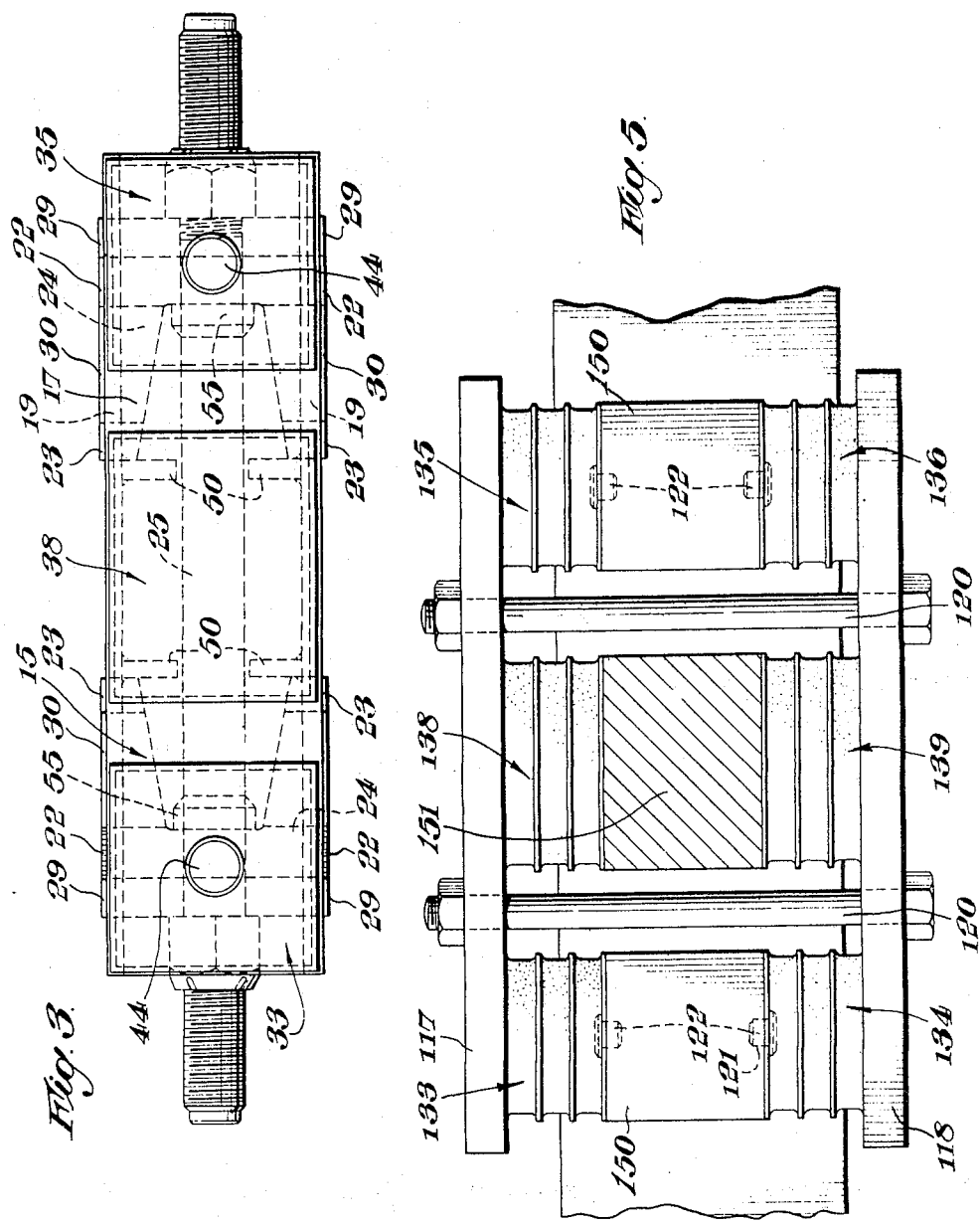
INVENTORS
ARCHIE JOHN HIRST
KENNETH JOHN BENJAMIN CLARK
BY
ATTORNEY March 29, 1966  A. J. HIRST ETAL  3,242,877
SUSPENSION ARRANGEMENTS FOR TRACTION MOTORS OF RAILWAY VEHICLES
Filed Sept. 9, 1964  7 Sheets-Sheet 5
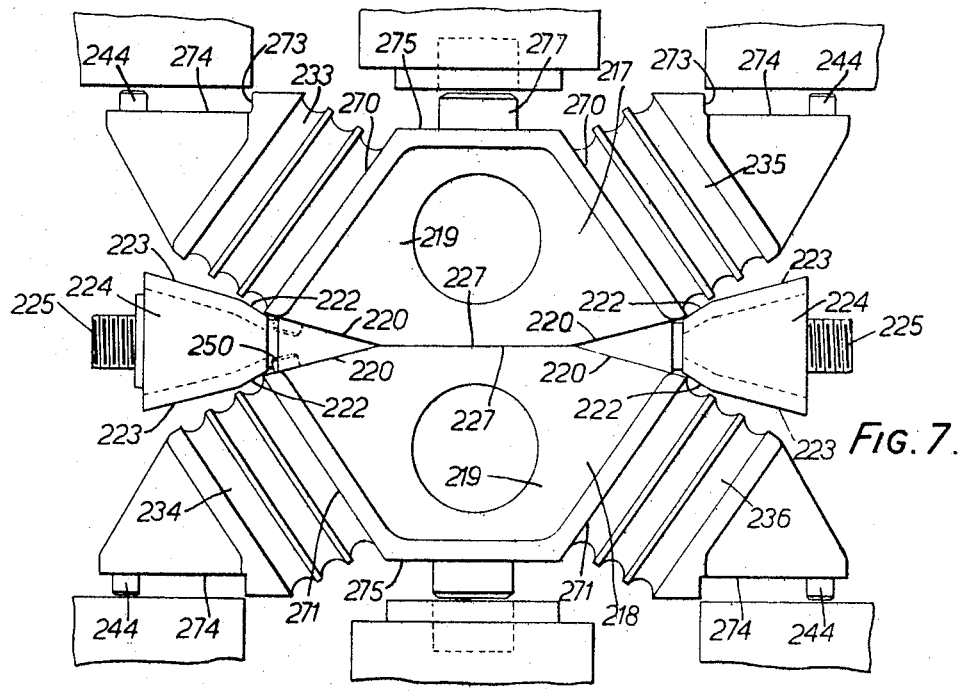
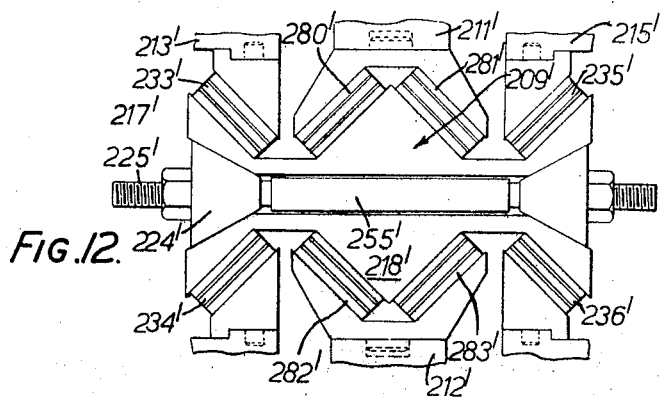
INVENTORS
ARCHIE JOHN HIRST
KENNETH JOHN BENJAMIN CLARK
BY
ATTORNEY March 29, 1966  A. J. HIRST ETAL  3,242,877
SUSPENSION ARRANGEMENTS FOR TRACTION MOTORS OF RAILWAY VEHICLES
Filed Sept. 9, 1964  7 Sheets-Sheet 6

INVENTORS
ARCHIE JOHN HIRST
KENNETH JOHN BENJAMIN CLARK

ATTORNEY

March 29, 1966  A. J. HIRST ETAL  3,242,877
SUSPENSION ARRANGEMENTS FOR TRACTION MOTORS OF RAILWAY VEHICLES
Filed Sept. 9, 1964  7 Sheets-Sheet 7

INVENTORS
ARCHIE JOHN HIRST
KENNETH JOHN BENJAMIN CLARK
BY
ATTORNEY

United States Patent Office 3,242,877
Patented Mar. 29, 1966

3,242,877
SUSPENSION ARRANGEMENTS FOR TRACTION MOTORS OF RAILWAY VEHICLES
Archie John Hirst, Leicester, and Kenneth John Benjamin Clark, Thurcaston, Leicester, England, assignors to Metalastik Limited, Leicester, England, a British company
Filed Sept. 9, 1964, Ser. No. 395,194
Claims priority, application Great Britain, Sept. 9, 1963, 35,572/63
57 Claims. (Cl. 105—136)

The present invention relates to suspension arrangements for electric traction motors of railway vehicles and concerns nose suspensions for axle hung traction motors and is a continuation-in-part of application Serial No. 288,043, filed June 14, 1963, and now abandoned.

An object of the invention is to provide a nose suspension in which spring means resiliently supports the motor nose through a beam member from the vehicle frame with the beam member disposed in the horizontal transverse direction of the vehicle, the suspension including means which permits angular movements of the motor nose with respect to the frame of the vehicle about a transverse and a longitudinal axis of the vehicle.

Another object of the invention is to provide a nose suspension in which the spring means is the means permitting the angular movements of the motor nose.

An alternative object is to provide a nose suspension in which the spring means resists angular movements of the motor nose and said angular movements are permitted by bearing means.

Another object of the invention is to provide a nose suspension in which the motor nose is sprung on the beam member and the beam member is sprung on the frame.

Another object of the invention is to provide a nose suspension in which the beam member is formed in two relatively displacable parts and incorporates jack means operable to displace the beam member parts to precompress the spring means during installation of the suspension.

Another object of the invention is to provide a nose suspension which is held in place by the jack means.

Another object of the invention is to provide a nose suspension which may be installed as a unit by horizontal movement transversely of the vehicle once the motor nose has been raised to the correct level by swinging the motor about the axle on which the motor is hung. The suspension may also, of course, be withdrawn in corresponding fashion.

Another object of the invention is to provide a nose suspension which gives a good vertical flexibility and low resistance to relative horizontal movements between the motor nose and the vehicle frame so that horizontal forces on the motor are carried, as far as possible, through the axle box guides for the axle boxes of the axle on which the traction motor is hung.

An alternative object of the present invention is to provide a nose suspension which will afford lateral control of the motor nose under side loading on the motor.

Figure 11:
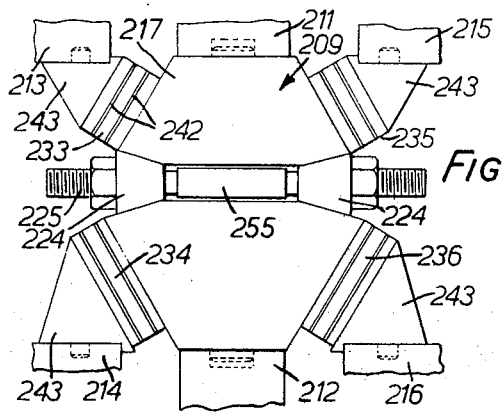
Figure 8:
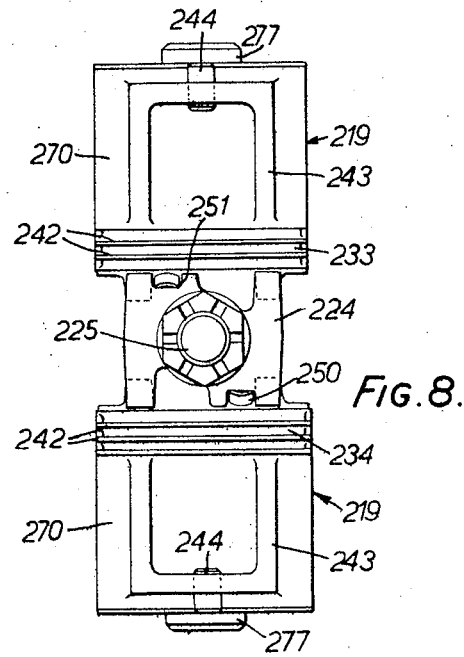
Figure 9:
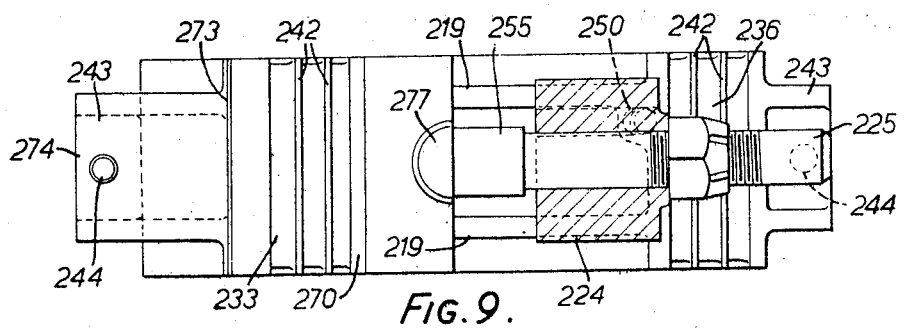
Figure 10:
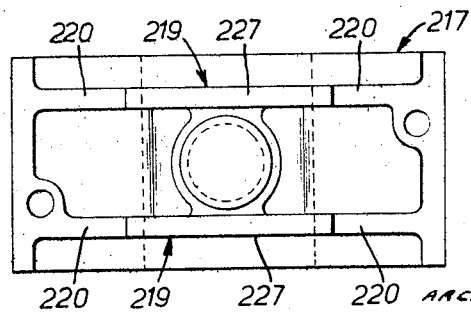
Figure 13:
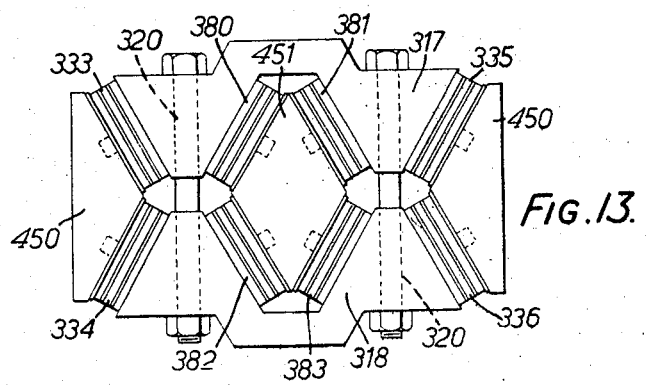
Figure 14:
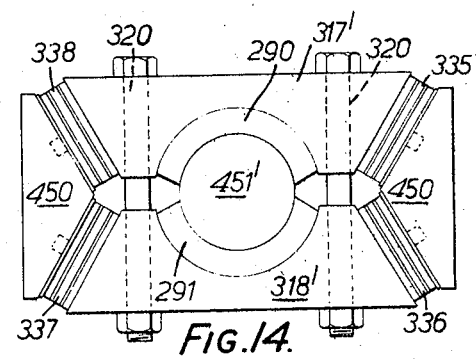
Figure 15:
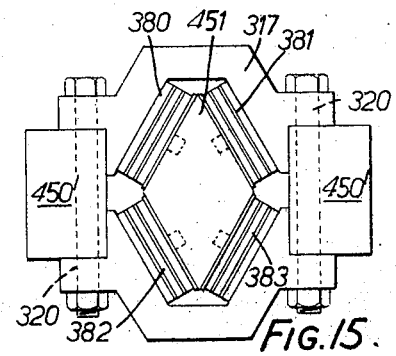

Specific embodiments of the present invention, meeting these and other objects of the present invention, will now be described by way of example with reference to the accompanying drawings in which:

FIG. 1 is a diagrammatic perspective view of a nose suspension according to the present invention,
FIG. 2 is a front elevation, in part, in section, of the suspension,
FIG. 3 is a plan view of the suspension,
FIG. 4 is an end view of the suspension,
FIG. 5 is a front elevation of a further nose suspension according to the present invention,
FIG. 6 is a front elevation, in part, in section, of a still further nose suspension according to the present invention,
FIG. 7 is a corresponding view but showing the suspension at an initial stage of its installation,
FIG. 8 is an end view of the suspension as shown in FIG. 6,
FIG. 9 is a plan view of the suspension as shown in FIG. 6,
FIG. 10 is an underneath plan view of a part of the suspension shown in FIG. 6 and showing further details of construction,
FIG. 11 is a diagrammatic, front elevation of a still further nose suspension according to the present invention,
FIG. 12 is a diagrammatic front elevation of a still further nose suspension according to the present invention,
FIG. 13 is a diagrammatic front elevation of a still further nose suspension according to the present invention,
FIG. 14 is a diagrammatic front elevation of a still further nose suspension according to the present invention, and
FIG. 15 is a diagrammatic front elevation of a still further nose suspension according to the present invention.

Referring to FIGS. 1 to 4 of the drawings, the motor nose 10, comprising upper and lower lugs 11, 12, is arranged to be received between two pairs of brackets 13, 14 and 15, 16 on a frame of the vehicle, for example a bogie frame, the brackets 13, 14 and 15, 16 being carried by a transom of the bogie frame. This arrangement is shown particularly in FIG. 1. The brackets and the lugs together define a rectangular through-way disposed horizontally and transversely of the vehicle into which and from which the nose suspension can be inserted and withdrawn in the horizontal transverse direction.

The nose suspension comprises a two part, horizontal beam member generally indicated at 9. The beam member is disposed transversely of the vehicle in the throughway defined by the brackets 13, 14 and 15, 16 and the motor nose lugs 11, 12. The parts of the beam member, generally indicated at 17 and 18, are of channel form in cross-section and disposed one above the other to define a beam member generally of hollow box-section (see FIG. 4). Jack means is incorporated for forcibly displacing the beam member parts with respect to one another to pre-load the springs of the suspension. To this end the flanges 19 of the beam member parts 17, 18 each have two pairs of oppositely inclined surfaces 20 and 21 to co-operate with correspondingly inclined wedge surfaces 22, 23 on one of a pair of wedge members 24 disposed between the parts 17, 18 and which may be drawn together, by a pair of nuts on a central screw threaded rod 25 passing freely through the wedge members and the box sectioned beam member, so that the inclined surfaces 20, 21 ride up the wedge surfaces 22, 23 and of the limit of the jacking movement further tightening of the nuts moves portions of the wedge members having horizontally disposed faces 28, 29 between opposed, parallel, horizontal faces 27, 28 on the flanges 19 as shown in FIG. 2. Each wedge member 24 has a pair of wedge portions each followed by a horizontally faced portion in the direction of movement of the wedge members and spaced apart in the lengthwise direction of the beam member parts so that each beam member part is supported at four locations along its length.

The upper part 17 and the lower part 18 of the beam member form, respectively, abutments for rubber compression spring blocks disposed vertically above and below the beam member in pairs. Thus the beam member 9 is supported towards one end by a pair of rubber compression spring blocks 33, 34 engaged respectively between the brackets 13, 14 and the beam member and towards its other end by a pair of rubber compression spring blocks 35, 36 engaged respectively between the brackets 15, 16 and the beam member. A further pair of rubber spring blocks 38, 39 is disposed between the pairs of rubber spring blocks 33, 34 and 35, 36, the blocks 38, 39 supporting the motor nose 10 from the beam member. Thus one block 38 is disposed between the upper lug 11 of the motor nose and the upper part 17 of the beam member and the other block 39 is disposed between the lower lug 12 and the lower part 18 of the beam member.

Each rubber compression spring block has a pair of metal interleaves 42 and an outer end plate 43, all bonded to the rubber, and the blocks are bonded also to the beam member parts 17, 18.

The blocks 33, 34 and 35, 36 are located, with respect to the brackets 13, 14 and 15, 16 by locating spigots 44 trapped in holes in the end plates 43 of the blocks, the spigots projecting from the plates and being received in holes 45 in the brackets. The end plates of the blocks 38, 39 simply engage the motor nose lugs 11, 12 and no locating spigots are provided.

Before installation of the nose suspension, the wedge members 24 lie with their wedge surfaces 22, 23 against the inclined edge portions 20, 21 of the flanges 19 with the horizontally disposed flange edge portions 27 of the parts 17, 18 engaging on the horizontally disposed flat surfaces 30 of the wedge members and the horizontally disposed flange edge portions 28 of the parts 17, 18 engaging against one another. The parts 17, 18 may be secured together in this condition by wire bindings which are readily broken when the nose suspension is installed, the nuts on the rod 25 holding the wedge members in position between the parts. In this condition the nose suspension is a clearance fit in the through-way formed by the brackets 13, 14 and 15, 16 on the transom and the lugs 11, 12 of the motor nose and may be introduced into the through-way in the transverse horizontal direction to align the spigots 44 with the holes 45 in the brackets and the wedge members 24 are then drawn together by screwing up the nuts on the rod 25, the parts 17, 18 then being forced apart by the jacking action of the co-operating inclined surfaces, breaking the wire straps holding them together, so that the parts 17, 18 assume the spaced apart position shown in the drawings. This precompresses the rubber compression spring blocks by a predetermined amount depending on the rise of the inclined surfaces on the flanges 19 and the initial clearance of the rubber compression spring blocks between respectively the pairs of brackets and the motor nose lugs.

In the installed condition, as shown in the drawings, the beam member parts 17, 18 are supported on the wedge members 24 towards their ends, as at 27, 29 and at two intermediate points as at 28, 30. Adequate support is therefore provided as previously explained.

Four metal pads 50 are welded into the channel of the beam member part 17 to locate the rod 25.

The rod 25 carries a pair of welded on collars 55 located in V-shaped cut-outs 51 in the wedge members whereby when one of the nuts is loosened one wedge member can be knocked out by hitting the rod in one direction and when the other nut is unscrewed the other wedge member knocked out by hitting the rod in the other direction.

In the example at present being described the rubber compression spring blocks are composed of rectangles of rubber having rectangular interleaves and rectangular outer end plates. These may however be circular with circular discs of rubber.

The lower compression spring blocks 34, 39, 36 support the static weight of the motor nose and also the torque reaction of the motor in compression in the rubber. The upper compression spring blocks 33, 38, 35 resist upward swinging of the motor about the axle on which it is hung, in compression in the rubber. Since the maximum force tending to swing the nose upwardly is usually slightly smaller than the maximum force tending to swing the motor nose downwardly, the blocks 34, 38, 36 may be larger than the blocks 33, 39, 35. The deflection afforded for upward and downward swinging is due to the combined deflection of the blocks 38, 39 and the blocks 33, 34 and 35, 36 and due to the series arrangement of the blocks adequate support against swinging movements is provided with a sufficient degree of flexibility.

Sideways movement of the motor in the horizontal direction (i.e. axially of the motor armature) subjects the spring blocks to shear and this applies also to horizontal longitudinal movements of the motor nose. A low resistance to relative movements of the motor nose in a horizontal plane is therefore provided and this is important in nose suspensions to ensure that all horizontal forces are carried, as far as possible, through the axle box guides for the axle boxes of the axle on which the traction motor is hung and not through the motor nose suspension. The suspension also allows flexibility of angular movement of the motor nose to accommodate bearing spring rise and fall and roll movement respectively. Roll movement causes angular movement of the motor nose about a longitudinal axis. The bearing spring rise and fall causes angular movement about a transverse axis.

The spring blocks act in parallel to provide for deflection in the horizontal plane and for the angular movements described and because of this a good flexibility can be achieved.

The amount of precompression in the rubber compression spring blocks is sufficient to maintain the blocks in compression under all normal operating conditions.

Instead of having spaced brackets 13, 14 and 15, 16 on the transom and spaced lugs 11, 12 to form the motor nose 10, the transom may, as shown in FIG. 5, carry a pair of transversely spaced lugs 150, lying in a common horizontal plane, the motor nose being constituted by a single lug 151 on the motor casing projecting between the transom lugs in the same horizontal plane. In this case the springs 133, 134 and 135, 136 are disposed one on each side of the two transom lugs 150 respectively and the springs 138, 139 one on each side of the motor nose lug. The beam member has two parts 117, 118 disposed horizontally one above the other the upper part 117 being connected (e.g. bonded) or (otherwise) located with respect to the upper ends of the springs 133, 138, 135 (e.g. by studs and holes) and the lower part 118 being likewise connected or located with respect to the lower ends of the springs 134, 139, 136. The beam member parts are in turn connected together by a pair of vertically disposed bolts 120 or the like one located on each side of the motor nose lug 151 between the motor nose lug and the adjacent transom lug 150. By tightening these bolts the beam member parts are drawn together to precompress the springs during installation of the nose suspension. The two outer pairs of springs are located with respect to the transom lugs by studs and holes 121, 122.

The last described construction may be modified in that the two lugs 150 on the transom are, instead, carried by the motor casing and the lug 151 on the motor is, instead, carried by the transom.

Likewise, in the construction described with reference to FIGS. 1 to 4 of the drawings, the lugs 11 and 12 may be on the transom and the brackets 13, 14 and 15, 16 on the motor casing.

In either event the springs 33, 34, 35 and 36 could be dispensed with, the beam member parts being clamped by the jack means directly against the brackets 13, 15 and 14, 16 respectively. In this case the single, central pair of springs is relied upon to permit the relative angular movements. Alternatively the springs 33, 34, 35 and 36 could be retained and the springs 38, 39 could be replaced by spherical seatings on the beam member parts, these allowing the relative angular movements of the motor nose about the horizontal transverse and longitudinal axes. Instead of spherical seatings, any other convenient form of motor nose engaging means could be provided, for example as hereinafter described with reference to FIG. 14, to permit the required relative angular movements.

Referring now to FIGS. 6 to 10 of the drawings, in a further construction aimed at giving lateral control of the motor nose, the motor nose 210, comprising vertically spaced upper and lower lugs 211, 212, is arranged to be received centrally between two pairs of brackets 213, 214 and 215, 216 on a frame of the vehicle, for example a bogie frame, the brackets 213, 214 and 215, 216 being carried by a transom of the bogie frame. This arrangement is shown in FIGS. 6 and 7. The brackets and the lugs together define a rectangular through-way disposed horizontally and transversely of the vehicle into which and from which the nose suspension can be inserted and withdrawn in the horizontal transverse direction as may be seen from FIG. 7.

The nose suspension again comprises a horizontal two part beam member which in the present construction is somewhat foreshortened and which is generally indicated at 209. The horizontal beam member is disposed transversely of the vehicle in the through-way defined by the brackets 213, 214 and 215, 216 and the motor nose lugs 211, 212. The parts of the beam member, generally indicated at 217 and 218, are castings of channel form in cross-section comprising an outer casing with two webs 219, the parts being disposed one above the other to define a generally hollow beam member. Jack means is incorporated for forcibly displacing the beam member parts with respect to one another to pre-load the springs of the suspension. To this end the webs 219 of the beam member parts 217, 218 each have a pair of oppositely inclined surfaces 220 to co-operate with correspondingly inclined wedge surfaces 222, 223, on one of a pair of wedge members 224 disposed between the parts 217, 218 and which may be drawn together, by a pair of nuts on a central screw threaded rod 225 passing freely through the wedge members and between the webs 219 of the beam member parts, so that the inclined surfaces 220 ride up the wedge surfaces 222, 223 from the position shown in FIG. 7 to the position shown in FIG. 6.

The outer casing of the upper part 217 and the lower part 218 of the beam member form respectively abutments for rubber shear/compression spring blocks disposed above and below the beam member in pairs. Thus the beam member 209 is supported towards one end by a pair of rubber shear/compression spring blocks 233, 234 engaged respectively between the brackets 213, 214 and the beam member and towards its other end by a pair of rubber shear/compression spring blocks 235, 236 engaged respectively between the brackets 215, 216 and the beam member.

Each spring block has a pair of metal interleaves 242 and an outer end member 243, all bonded to the rubber, and the blocks are bonded also to surfaces 270, 271 on the beam member parts 217, 218 which are oppositely inclined with respect to the transverse horizontal direction. The spring blocks 233, 235 resist upward movement of the beam member with respect to the frame and these springs are arranged in inverted V formation above the other two spring blocks which resist downward movement of the beam member with respect to the frame and which are arranged in upright V formation.

The outer end members 243 of the spring blocks are of wedge form each presenting a transversely outwardly facing ledge 273 on its upper (or lower) surface 274.

The spring blocks 233, 234 and 235, 236 are located, with respect to the brackets 213, 214 and 215, 216 by the ledges 273 and by locating spigots 244 on the members 243 received in holes 245 in the brackets. The motor nose lugs 211, 212 engage directly flat against horizontally disposed surfaces 275 on the beam member parts 217, 218 on which they are located centrally between the pairs of spring blocks by spigots 277 entered in holes in the motor nose lugs.

Before installation of the nose suspension, the wedge members 224 lie with their wedge surfaces 222, beyond the leading edges of the surfaces 220 on the webs 219 with horizontally disposed edge portions 227 of the webs 219 resting on one another. The parts 217, 218 may be tied together in this condition with wire or the like which is readily broken when the nose suspension is installed, the nuts on the rod 225 holding the wedge members in position between the parts. In this condition the nose suspension is a clearance fit in the through-way formed by the brackets 213, 214 and 215, 216 on the transom and the lugs 211, 212 of the motor nose and may be introduced into the through-way in the transverse horizontal direction as shown in FIG. 7 to align the spigots 244, 277 with the holes in the brackets and the motor nose lugs. The wedge members 224 are then drawn together by screwing up the nuts on the rod 225, the parts 217, 218 then being forced apart by the jacking action of the co-operating inclined surfaces, breaking the wire holding them together, so that the parts 217, 218 assume the spaced apart position shown in FIGS. 6, 8 and 9 of the drawings. This precompresses the spring blocks by a predetermined amount depending on the rise of the inclined surfaces 220 on the webs 219 and the initial clearance between the surfaces 274 and the surfaces 275 and, respectively, the pairs of brackets and the motor nose lugs.

Four metal dowels 250 are provided on the beam member parts to locate the wedge members 224 and therefore the rod 225, the dowels sliding in grooves 251 in the wedge members.

The jacking action also clamps the parts 217, 218 between, and rigidly fixes them with respect to the lugs 211 and 212.

The rod 225 carries a central collar 255 whereby when one of the nuts is loosened one wedge member 224 can be knocked out by hitting the rod in one direction and when the other nut is unscrewed the other wedge member can be knocked out by hitting the rod in the other direction.

In the example at present being described the spring blocks are composed of rectangular rubber pads having rectangular interleaves. These may however be circular with circular discs of rubber.

The lower spring blocks 234, 236 support the static weight of the motor nose and also the torque reaction of the motor in combined shear and compression in the rubber due to their inclination with respect to the vertical direction. The upper spring blocks 233, 235 resist upward swinging of the motor nose about the axle on which the motor is hung, in combined shear and compression in the rubber again due to their inclination with respect to the vertical direction. Since the maximum force tending to swing the motor nose upwardly is usually slightly smaller than the maximum force tending to swing the motor nose downwardly, the blocks 234, 236 may be larger than the blocks 233, 235. Since the deflection of the blocks for upward and downward swinging takes place partly in shear, a sufficient degree of flexibility may be achieved. At the same time, the compression in the blocks due to upward or downward swinging movement ensures that there is adequate support for the motor nose in the up and down directions.

Sideways movement of the motor in the horizontal direction (i.e. axially of the motor armature) subjects the spring blocks to combined shear and compression. A corresponding resistance to relative movements of the motor nose in both transverse horizontal directions is therefore provided as required. Flexibility of angular movement of the motor nose to follow rise and fall and roll movement respectively of the wheels of the axle on which the motor is hung is accommodated by the spring blocks mainly in shear. Roll movement causes angular movement of the motor nose about a longitudinal axis. The rise and fall movement causes angular movement of the motor nose about a transverse axis.

The spring blocks in the construction just described are of the same proportion so as to be capable of manufacture all in the same mould. This reduces the cost of production. If desired, however, the spring blocks 234, 236 may have larger dimensions than the spring blocks 233, 235 and employ a greater volume of rubber, the overall volume of rubber however remaining approximately the same. This is shown in FIG. 11 where the spring blocks are shown inclined more steeply with respect to the transverse horizontal direction. This gives rise to a greater vertical flexibility with increased horizontal transverse stiffness.

To further increase the vertical flexibility whilst maintaining the lateral control required, the spring blocks 233, 235 and 234, 236 may be supplemented by further rubber spring blocks inclined with respect to the vertical and transverse horizontal directions and disposed between the motor nose lugs 211, and 212 and the beam member parts 217, 218. Such a construction is diagrammatically indicated in FIG. 12. In this case the inclination of each of the blocks 233', 235' and 234', 236' is reversed compared with the previous construction whereby tilting of the beam member 209' about an axis extending longitudinally of the vehicle is strongly resisted by these blocks acting mainly or wholly in compression. The further rubber spring blocks, which are preferably interleaved as previously described, are indicated at 280', 281', 282' and 283', two above the beam member in inverted V formation to resist downward movement of the motor nose with respect to the beam member and two below the beam memer in upright V formation to resist upward movement of the motor nose with respect to the beam member. The spring blocks 280', 281', 282' and 283' accommodate tilting of the motor nose about the longitudinal axis mainly by shear deformation.

Instead of having the spaced brackets 213, 214 and 215, 216 on the transom and spaced lugs 211, 212 to form the motor nose 210, the transom may carry a pair of transversely spaced lugs 450 (see FIG. 13) lying in a common horizontal plane, the motor nose being constituted by a single lug 451 on the motor casing projecting between the transom lugs in the same horizontal plane. In this case rubber shear/compression spring blocks 333, 334 and 335, 336 are provided abutting the two transom lugs 250 respectively and rubber shear/compression spring blocks 380, 381, 382 and 383 are provided abutting the motor nose lug. All these spring blocks are inclined with respect to the transverse horizontal and vertical directions, the spring blocks 380, 381, 382 and 383 being arranged generally like the spring blocks 280', 281', 282' and 283' in FIG. 12 and the spring blocks 333, 334, 335 and 336 being arranged generally like the spring blocks 233', 234', 235' and 236' in FIG. 12. The beam member has two parts 317, 318 disposed horizontally one above the other the upper part 317 being connected (e.g. bonded) or (otherwise) located with respect to the upper ends of the spring blocks 333, 335, 380, 381 (e.g. by studs and holes) and the lower part 318 being likewise connected or located with respect to the lower ends of the spring blocks 334, 382, 383, 336. The beam member parts are in turn connected together by a pair of vertically disposed bolts 320 or the like one located on each side of the motor nose lug 451 between the motor nose lug and the adjacent transom lug 450. By tightening these bolts the beam member parts are drawn together to precompress the spring blocks during installation of the nose suspension. The two outer pairs of spring blocks are located with respect to the transom lugs by studs and holes. Instead, end plates on the springs may rest against ledges on the lugs. This form of location may also be used to locate the spring blocks 380, 381, 382 and 383 on the motor nose.

The last described construction may be modified in that the two lugs 450 on the transom are, instead, carried by the motor casing and the lug 451 on the motor is, instead, carried by the transom.

Likewise, in the construction described with reference to FIGS. 6 to 10 or FIG. 11 or FIG. 12 of the drawings, the lugs 211 and 212 may be on the transom and the brackets 213, 214 and 215, 216 on the motor casing.

In the FIG. 13 construction the spring blocks 380, 381, 382 and 383 may be replaced by a cylindrical or spherical rubber bearing or by a spherical metal seating to allow for angular movement of the motor nose about a longitudinal axis or a longitudinal and horizontal transverse axis of the vehicle. A construction employing a cylindrical rubber bearing is shown in FIG. 14. The bearing is in two part cylindrical parts 290, 291, bonded respectively to the upper and lower beam member parts 317', 318' and held in radial precompression against the motor nose lug 451' which is likewise of cylindrical form. The FIG. 14 construction is otherwise as described for FIG. 13 and the cylindrical lug 451' may be on the transom if desired the lugs 450 being on the motor casing.

The bolts 320 in the FIG. 13 construction may bolt the beam member parts 317, 318 directly to lugs 450 on the transom or on the motor casing. This is shown in FIG. 10.

The term "rubber" used in this specification is to be taken to include materials having rubber-like properties.

We claim:

1. A nose suspension for an axle hung traction motor of a railway vehicle comprising a beam member to be disposed in the horizontal transverse direction of the vehicle, two pairs of springs for supporting the beam member from a frame of the vehicle, said pairs of springs being located respectively one towards each end of the beam member and arranged for the engagement of each spring of each pair between the beam member and the frame of the vehicle, and a further pair of springs for supporting the motor nose from the beam member, said further pair of springs being located between said first said pairs of springs and arranged for the engagement of each spring between the beam member and the motor nose.

2. A nose suspension for an axle traction motor of a railway vehicle comprising a beam member to be disposed in the horizontal transverse direction of the vehicle, a single pair of springs for supporting the beam member from a frame of the vehicle, which springs are located centrally of the beam member and arranged each for engagement between the beam member and the frame of the vehicle and two further pairs of springs for supporting the motor nose from the beam member, the two further springs being disposed one on each side of said central pair of springs so as to be equally spaced therefrom, the springs of said two further pairs of springs being arranged for engagement each between the beam member and the motor nose.

3. A nose suspension for an axle hung traction motor of a railway vehicle comprising a beam member to be disposed in the horizontal transverse direction of the vehicle, spring means for supporting the beam member from a frame of the vehicle and spring means for supporting the motor nose from the beam member, said spring means consisting of pairs of springs, the springs of each pair being disposed one above the other, one to resist upward movement of the beam member with respect to the frame of the vehicle and the other to resist downward movement of the beam member with respect to the frame of the vehicle, and the beam member is in two parts constituting respectively the abutments for the individual springs of each of said pairs of springs with the beam member, the beam member incorporating jack means for forcibly displacing the beam member parts with respect to one another to preload the pairs of springs during installation of the suspension.

4. A nose suspension as claimed in claim 3, wherein the beam member parts are disposed between the individual springs of said pairs of springs and the jack means is operable to force the beam member parts apart to preload the pairs of springs during installation of the suspension.

5. A nose suspension as claimed in claim 4, wherein the jack means comprises oppositely inclined surfaces on each of the beam members parts, a pair of wedge members disposed between the beam member parts to co-operate each with at least a pair of said surfaces one on each of the beam member parts, and screw means inter-connecting the wedge members and movable to move the wedge members with respect to one another and to their co-operating surfaces on the beam member parts to force the beam member parts apart.

6. A nose suspension as claimed in claim 5, wherein the wedge members have portions with faces disposed normal to the pre-loading direction to be engaged, at the limit the jacking movement by further movement of the screw means, between opposed, parallel faces on the beam member parts, the opposed, parallel faces also being disposed normal to the pre-loading direction.

7. A nose suspension as claimed in claim 6, wherein each wedge member has a pair of wedge portions each followed by a normally faced portion in the direction of movement of the wedge members, the normally faced portions being spaced apart in the lengthwise direction of the beam member parts each to be engaged between opposed, parallel faces on the beam member parts after they have been forced apart by the jack means.

8. A nose suspension as claimed in claim 7, wherein the beam member parts are of channel section and together constitute a box-sectioned beam member, said oppositely inclined surfaces and said opposed,, parallel faces are formed on the side flanges of the channel sectioned parts and the wedge members are located respectively at the two ends of the beam member and are movable towards one another to force the beam member parts apart, the screw means being in the form of a threaded rod passing longitudinally through the box-sectioned beam member and through the wedge members.

9. A nose suspension as claimed in claim 8, wherein the screw-threaded rod passes freely through the wedge members, the screw means further comprising nuts or the like elements on the rod to the outside of the wedge members, and the rod has a pair of abutment collars between the wedge members whereby the wedge members may be knocked out from between their opposed, parallel faces on the beam member parts by hitting the screw-threaded rod after having loosened the nuts.

10. A nose suspension as claimed in claim 3, wherein the beam member parts are disposed respectively one to one side of said pairs of springs and the other to the other side of said pairs of springs, and the jack means is operable to draw the beam member parts together to preload the pairs of springs during installation of the suspension.

11. A nose suspension as claimed in claim 3, wherein the pairs of springs are pairs of rubber springs.

12. A nose suspension as claimed in claim 11, wherein the rubber springs are interleaved, rubber compression spring blocks.

13. In a railway vehicle having an electric, axle hung traction motor, a nose suspension for the motor comprising a beam member, two pairs of springs supporting the beam member from a frame of the vehicle with the beam member disposed in the horizontal, transverse direction of the vehicle, said pairs of springs being located respectively one towards each end of the beam member, and a further pair of springs between said first said pairs of springs, said further pair of springs supporting the motor nose from the beam member, the beam member being in two parts constituting respectively the abutments for the springs of each of said pairs of springs with the beam member, the beam member parts being disposed between the individual springs of said pairs of springs, the beam member incorporating jack means maintaining the beam member parts apart and thereby pre-loading the pairs of springs, each spring of each pair of said first said pairs of springs being held by said jack means in precompression between the beam member and a bracket on the frame, with one spring of each pair vertically above, and the other vertically below the beam member, the springs of said further pair of springs being arranged one vertically above and the other vertically below the beam member and being held each in precompression by said jack means between the beam member and a lug on the motor casing, the lugs on the motor casing constituting the motor nose.

14. In a railway vehicle having an electric, axle hung traction motor, a nose suspension for the motor comprising a beam member, a single pair of springs supporting the beam member from a frame of the vehicle with the beam member disposed in the horizontal, transverse direction of the vehicle, said pair of springs being located centrally of the beam member, and two further pairs of springs supporting the motor nose from the beam member, the two further pairs of springs being disposed one on each side of said single pair of springs so as to be equally spaced therefrom, the beam member being in two parts constituting respectively the abutments for the springs of each of said pairs of springs with the beam member, the beam member incorporating jack means maintaining the beam member parts apart and thereby pre-loading the pairs of springs, the springs of said single pair of springs being held respectively in precompression by said jack means each between the beam member and a bracket on the frame with one spring vertically above and the other spring vertically below the beam member, said two further pairs of springs being arranged with one spring of each pair vertically above the beam member and the other spring of the pair vertically below the beam member, the springs of the two further pairs of springs being held each in precompression by said jack means between the beam member and a lug on the motor casing, the lugs on the motor casing constituting the motor nose.

15. A railway vehicle as claimed in claim 13, wherein the brackets on the vehicle frame and the motor nose lugs together define a horizontal, transversely disposed through-way into and from which the nose suspension may be introduced and withdrawn by horizontal, transverse movement when the jack means is released.

16. A railway vehicle as claimed in claim 14, wherein the brackets on the vehicle frame and the motor nose lugs together define a horizontal, transversely disposed through-way into and from which the suspension may be introduced and withdrawn by horizontal, transverse movement when the jack means is released.

17. In a railway vehicle having an electric, axle hung traction motor, a nose suspension for the motor comprising a beam member, two pairs of springs supporting the beam member from a frame of the vehicle with the beam member disposed in the horizontal transverse direction of the vehicle, said pairs of springs being located respectively one towards each end of the beam member, and a further pair of springs between said first said pairs of springs and supporting the motor nose from the beam member, the beam member being in two parts constituting respectively the abutments for the springs of each of said first said pairs of springs with the beam member, the beam member parts being disposed respectively one to one side of said pairs of springs and the other to the other side of said pairs of springs, the beam member incorporating jack means forcibly maintaining the beam member parts displaced towards one another thereby preloading the pairs of springs, the springs of each of said first said pairs of springs being held by the jack means in precompression between the beam member and a lug on the frame of the vehicle, the springs of each pair being disposed vertically one above the other with the frame lug between them, the springs of said further pair of springs being arranged one vertically above and the other vertically below a lug on the motor casing which constitutes the motor nose, said further pair of springs each being held in precompression by the jack means between the beam member and the motor nose lug.

18. In a railway vehicle having an electric, axle hung traction motor, a nose suspension for the motor comprising a beam member, a single pair of springs supporting the beam member from a frame of the vehicle with the beam member disposed in the horizontal transverse direction of the vehicle, said single pair of springs being located centrally of the beam member and two further pairs of springs supporting the motor nose from the beam member, the two further pairs of springs being disposed one on each side of said central pair of springs so as to be equally spaced therefrom, the beam member being in two parts constituting respectively the abutments for the springs of each of said pairs of springs with the beam member, the beam member parts being disposed respectively one to one side of said pairs of springs and the other to the other side of said pairs of springs, the beam member incorporating jack means forcibly holding the beam member parts displaced towards one another thereby preloading the pairs of springs, said single pair of springs being held in precompression by the jack means between the beam member and a lug on the frame, the springs of said single pair of springs being disposed respectively one vertically above and the other vertically below the frame lug, the springs of each of said two further pairs of springs being held in precompression by the jack means between the beam member and a lug on the motor casing with one spring vertically above and the other vertically below the motor casing lug, the motor casing lugs together constituting the motor nose.

19. In a railway vehicle, a suspension supporting the nose of an electric, axle hung traction motor of the vehicle from a frame of the vehicle, said nose suspension comprising a horizontal, transversely disposed beam member which is in two parts and which incorporates jack means located between the beam member parts and forcibly maintaining the beam member parts in a spaced apart relation thereby pre-loading in compression rubber compression spring blocks disposed respectively vertically above and below the beam member, said rubber compression spring blocks resiliently supporting the motor nose through said beam member from brackets on said frame, said brackets and the motor nose together defining a horizontal, transversely disposed through-way into and from which the nose suspension may be introduced and withdrawn by horizontal transverse movement when the jack means is released.

20. In a railway vehicle, a nose suspension as claimed in claim 19, wherein the beam member parts are held by said jack means in engagement with said brackets without the interposition of spring means, each of the rubber compression spring blocks being disposed between the beam member and a lug on the motor casing, the motor casing lugs together constituting the motor nose, two only of said rubber compression spring blocks being provided, in vertical alignment, one above and the other below the beam member, the beam member being clamped by said jack means between two pairs of said brackets on the frame, disposed one pair towards each end of the beam member, the rubber compression spring blocks being disposed between said pairs of brackets.

21. In a railway vehicle, a nose suspension as claimed in claim 19, wherein four of said rubber compression spring blocks are provided each disposed between the beam member and one of said brackets on the frame, the rubber compression spring blocks being arranged in two pairs one towards each end of the beam member, with the springs of each pair disposed one vertically above and the other vertically below the beam member, the motor nose being supported from the beam member between said pairs of springs by means permitting angular movements of the motor nose with respect to said frame about longitudinal and transverse horizontal axes.

22. A nose suspension for an axle hung traction motor of a railway vehicle comprising a beam member, rubber spring means for resiliently supporting the motor nose through the beam member from a frame of the vehicle with the beam member disposed in the horizontal transverse direction of the vehicle and with the rubber spring means inclined with respect to the vertical and transverse horizontal directions, means being provided on the beam member for engaging and supporting the motor nose, the suspension including means permitting, in use of the suspension, angular movements of the motor nose with respect to the frame of the vehicle about a longitudinal and a transverse axis of the vehicle.

23. A nose suspension as claimed in claim 22, wherein at least two rubber springs are provided for resisting respectively upward and downward movement of the motor nose with respect to the frame of the vehicle each set of two springs for resisting relative movement in the upward and downward directions being themselves oppositely inclined with respect to transverse horizontal direction.

24. A nose suspension as claimed in claim 23 wherein all the rubber springs are of the same proportions and all are inclined at the same angle with respect to the transverse horizontal direction.

25. A nose suspension as claimed in claim 23 wherein rubber springs for resisting downward movement of the beam member with respect to the frame of the vehicle have larger dimensions and employ a greater volume of rubber than rubber springs for resisting upward movement of the beam member with respect to the frame of the vehicle.

26. A nose suspension as claimed in claim 23, wherein rubber springs for resisting downward movement of the motor nose with respect to the beam member have larger dimensions and employ a greater volume of rubber than rubber springs for resisting upward movement of the motor nose with respect to the beam member.

27. A nose suspension as claimed in claim 22 comprising two pairs of said rubber springs located respectively one towards each end of the beam member and arranged for the engagement of each spring of each pair between the beam member and the frame of the vehicle from which the beam member is to be supported, two of these springs, for resisting upward movement of the beam member with respect to the frame of the vehicle, being arranged in inverted V formation, above the other two springs which are arranged in upright V formation, to resist downward movement of the beam member with respect to the frame of the vehicle, the beam member being adapted directly to support the motor nose centrally between said pairs of springs.

28. A nose suspension as claimed in claim 23 comprising two pairs of said rubber springs located respectively one towards each end of the beam member and arranged for the engagement of each spring of each pair between the beam member and the motor nose, two of these springs, for resisting downward movement of the motor nose with respect to the beam member being arranged in inverted V formation above the other two springs which are arranged in upright V formation, to resist upward movement of the motor nose with respect to the beam member, the beam member being adapted to be supported centrally between said pairs of springs directly by the frame of the vehicle.

29. A nose suspension as claimed in claim 23 comprising four pairs of said rubber springs, two of said pairs of springs being located respectively one towards each end of the beam member and arranged for the engagement of each spring of each pair between the beam member and the frame of the vehicle from which the beam member is to be supported, two of these springs, for resisting upward movement of the beam member with respect to the frame of the vehicle, being arranged in upright V formation above the other two springs which are arranged in inverted V formation, to resist downward movement of the beam member with respect to the frame of the vehicle and the other two pairs of said springs being arranged symmetrically and centrally between said first said pairs of springs for supporting the motor nose fram the beam member, two of these springs, for resisting downward movement of the motor nose with respect to the beam member, being arranged in inverted V formation above the other two springs which are arranged in upright V formation to resist upward movement of the motor nose with respect to the beam member.

30. A nose suspension as claimed in claim 23 comprising four pairs of said rubber springs, two of said pairs of springs being located respectively one towards each end of the beam member, and arranged for the engagement of each spring of each pair between the beam member and the motor nose, two of these springs, for resisting downward movement of the motor nose with respect to the beam member, being arranged in upright V formation above the other two springs which are arranged, in inverted V-formation, to resist upward movement of the motor nose with respect to the beam member and the other two pairs of said springs being arranged symmetrically and centrally between said first said pairs of springs for supporting the beam member from the frame of the vehicle from which the beam member is to be supported, two of these springs, for resisting downward movement of the beam member with respect to the frame of the vehicle, being arranged in upright V formation below the other two springs which are arranged, in inverted V formation, to resist upward movement of the beam member with respect to the frame of the vehicle.

31. A nose suspension as claimed in claim 23 comprising four pairs of said rubber springs, two of said pairs of springs being located respectively one towards each end of the beam member and arranged for the engagement of each spring of each pair between the beam member and the frame of the vehicle from which the beam member is to be supported, two of these springs, for resisting upward movement of the beam member with respect to the frame of the vehicle, being arranged in inverted V formation below the other two springs which are arranged, in upright V formation, to resist downward movement of the beam member with respect to the frame of the vehicle and the other two pairs of said springs being arranged symmetrically and centrally between said first said pairs of springs for supporting the motor nose from the beam member, two of these springs, for resisting downward movement of the motor nose with respect to the beam member, being arranged in upright V formation below the other two springs which are arranged in inverted V formation to resist upward movement of the motor nose with respect to the beam member.

32. A nose suspension as claimed in claim 23 comprising four pairs of said rubber springs, two of said pairs of springs being located respectively one towards each end of the beam member and arranged for the engagement of each spring of each pair between the beam member and the motor nose, two of these springs, for resisting downward movement of the motor nose with respect to the beam member, being arranged in inverted V formation below the other two springs which are arranged in upright V formation to resist upward movement of the motor nose with respect to the beam member and the other two pairs of said springs being arranged symmetrically and centrally between said first said pairs of springs for supporting the beam member from the frame of the vehicle from which the beam member is to be supported, two of these springs, for resisting downward movement of the beam member with respect to the frame of the vehicle being arranged in inverted V formation above the other two springs which are arranged, in upright V formation to resist upward movement of the beam member with respect to the frame of the vehicle.

33. A nose suspension as claimed in claim 23 comprising two pairs of said rubber springs located respectively one towards each end of the beam member and arranged for the engagement of each spring of each pair between the beam member and the frame of the vehicle from which the beam member is to be supported, two of these springs, for resisting downward movement of the beam member with respect to the frame of the vehicle being arranged in upright V formation above the other two springs which are arranged in inverted V formation to resist upward movement of the beam member with respect to the frame of the vehicle, the beam member having a cylindrical or part spherical rubber bearing or a part spherical seating for the motor nose, disposed centrally between said pairs of rubber springs to permit, in use of the suspension, angular movements of the motor nose with respect to the beam member about longitudinal and transverse axes of the vehicle.

34. A nose suspension as claimed in claim 23 comprising two pairs of said rubber springs located respectively one towards each end of the beam member and arranged for the engagement of each spring of each pair between the beam member and the motor nose, two of these springs, for resisting downward movement of the motor nose with respect to the beam member, being arranged in inverted V formation below the other two springs which are arranged in upright V formation to resist upward movement of the motor nose with respect to the beam member, the beam member having one element of a joint connection disposed centrally between said pairs of rubber springs to co-operate with a complementary element of a joint connection to support the beam member from the frame of the vehicle from which the beam member is to be supported in a manner permitting angular movements of the motor nose with respect to the frame about longitudinal and transverse axes of the vehicle.

35. A nose suspension as claimed in claim 23 comprising two pairs of said rubber springs located symmetrically and centrally of the ends of beam member and arranged for the engagement of each spring of each pair between the beam member and the motor nose, two of the springs, for resisting downward movement of the motor nose with respect to the beam member, being arranged in upright V formation below the other two springs which are arranged, in inverted V formation, to resist upward movement of the motor nose with respect to the beam member, the beam member being adapted to be supported at each end directly from the frame of the vehicle.

36. A nose suspension as claimed in claim 23 comprising two pairs of said rubber springs located symmetrically and centrally of the ends of the beam member and arranged for the engagement of each spring of each pair between the beam member and the frame of the vehicle from which the beam member is to be supported, two of these springs, for resisting upward movement of the beam member with respect to the frame of the vehicle being arranged in upright V formation below the other two springs which are arranged, in inverted V formation, to resist downward movement of the beam member with respect to the frame of the vehicle, the beam member being adapted directly to support the motor nose to each side of the pairs of springs.

37. A nose suspension as claimed in claim 27 wherein the beam member is in two parts constituting respectively the abutments for the springs of each of said pairs of springs with the beam member, the beam member incorporating jack means for forcibly displacing the beam member parts with respect to one another to pre-load the pairs of springs during installation of the suspension.

38. A nose suspension as claimed in claim 36 wherein the beam member parts are disposed between the individual springs of said pairs of springs and the jack means is operable to force the beam member parts apart to pre-load the pairs of springs during installation of the suspension.

39. A nose suspension as claimed in claim 38 wherein the jack means comprises oppositely inclined surfaces on each of the beam member parts, a pair of wedge members disposed between the beam member parts to co-operate each with at least a pair of said surfaces, one on each of the beam member parts and screw means interconnecting the wedge members and movable to move the wedge members with respect to one another and to their co-operating surfaces on the beam member parts to force the beam member parts apart.

40. A nose suspension as claimed in claim 38 wherein the beam member parts are of channel form in cross-section and together constitute a box-sectioned beam member, said oppositely inclined surfaces and said opposed, parallel faces are formed on the two side webs of the box-sided parts and the wedge members are located respectively at the two ends of the beam member and are movable towards one another to force the beam member parts apart, the screw means being in the form of a threaded rod passing longitudinally through the box-sectioned beam member and through the wedge members.

41. A nose suspension as claimed in claim 40 wherein the screw-threaded rod passes freely through the wedge members, the screw means further comprising nuts or like elements on the rod to the outside of the wedge members, and the rod has a collar fixed thereon between the wedge members whereby the wedge members may be knocked out from between the beam member parts by hitting the screw threaded rod after having loosened the nuts.

42. A nose suspension as claimed in claim 36 wherein the beam member parts are disposed respectively one above and one below said pairs of springs and the jack means is operable to draw the beam member parts together to preload the pairs of springs during installation of the suspension.

43. In a railway vehicle having an electric, axle hung, traction motor, a nose suspension for the motor according to claim 38 wherein the beam member is disposed horizontally and transversely of the vehicle, the beam member being supported from a frame of the vehicle by said two pairs of springs, the springs of each pair being held by said jack means each respectively in precompression between the beam member and a bracket on the frame with one spring of each pair vertically above and the other vertically below the beam member, the jack means also holding the beam member parts clamped between and rigidly fixed with respect to a pair of vertically spaced lugs on the motor casing, the lugs being disposed centrally between said pairs of springs and together constituting the motor nose.

44. In a railway vehicle having an electric, axle hung, traction motor, a nose suspension for the motor according to claim 28, wherein the beam member is in two parts constituting respectively the abutments for the springs of each of said pairs of springs with the beam member, the beam member parts being disposed between the individual springs of said pairs of springs and the beam member incorporating jack means forcibly maintaining the beam member parts apart the beam member being disposed horizontally and transversely of the vehicle and being supported centrally from and rigidly fixed with respect to a pair of vertically spaced brackets on the vehicle frame between which it is clamped by the jack means, said pair of springs being arranged with one spring of each pair vertically above the beam member and the other spring of the pair vertically below the beam member, the springs of said pairs of springs being held in precompression by the jack means between the beam member and a lug on the motor casing constituting part of the motor nose.

45. In a railway vehicle having an electric, axle hung, traction motor, a nose suspension for the motor according to claim 29 wherein the beam member is in two parts constituting respectively the abutments for the springs of each of said pairs of springs with the beam member, the beam member parts being disposed between the individual springs of said pairs of springs and the beam member incorporating jack means forcibly maintaining the beam member parts apart the beam member being disposed horizontally and transversely of the vehicle and being supported from a frame of the vehicle by said two of said pairs of springs, the springs of each pair being held by the jack means each respectively in precompression between the beam member and a bracket on the frame, with one spring of each pair vertically above and the other vertically below the beam member, said other two pairs of said springs being arranged with one spring of each pair vertically above and the other vertically below the beam member the two springs of these pairs respectively above and below the beam member being held by the jack means each in precompression between the beam member and a lug on the motor casing constituting part of the motor nose.

46. In a railway vehicle having an electric, axle hung, traction motor a nose suspension for the motor according to claim 30 wherein the beam member is in two parts constituting respectively the abutments for the springs of each of said pairs of springs with the beam member, the beam member parts being disposed between the individual springs of said pairs of springs and the beam member incorporating jack means forcibly maintaining the beam member parts apart the beam member being disposed horizontally and transversely of the vehicle and supported from a frame of the vehicle by said other two pairs of said springs which are arranged with one spring of each pair vertically above and the other vertically below the beam member, the two springs respectively above and below the beam member being held by the jack means each in precompression between the beam member and a bracket on the frame, said two of said pairs of springs being arranged with one spring of each pair vertically above and the other spring of the pair vertically below the beam member with each spring held in precompression by the jack means between the beam member and a lug on the motor casing constituting part of the motor nose.

47. In a railway vehicle, a nose suspension for an axle hung traction motor as claimed in claim 43 wherein the brackets on the vehicle frame and the motor nose lugs together define a horizontal, transversely disposed through-way into and from which the suspension may be introduced and withdrawn by horizontal transverse movement.

48. In a railway vehicle having an electric, axle hung, traction motor, a nose suspension for the motor according to claim 31 wherein the beam member is in two parts constituting respectively the abutments for the springs of each of said pairs of springs with the beam member, the beam member parts being disposed respectively one above and one below said pairs of springs and the beam member incorporating jack means holding the beam member parts drawn together the beam member being disposed horizontally and transversely of the vehicle and being supported from a frame of the vehicle by said two of said pairs of springs the springs of each pair being disposed one above the other and held in precompression by the jack means between the beam member and a common lug on the frame of the vehicle said other two pairs of springs being arranged with one spring of each pair above the other, the springs being held by the jack means each in precompression between the beam member and a common lug on the motor casing constituting the motor nose.

49. In a railway vehicle having an electric, axle hung, traction motor a nose suspension for the motor according to claim 32 wherein the beam member is in two parts constituting respectively the abutments for the springs of each of said pairs of springs with the beam member, the beam member parts being disposed respectively one above and one below said pairs of springs and the beam member incorporating jack means holding the beam member parts drawn together the beam member being disposed horizontally and transversely of the vehicle and being supported from a frame of the vehicle by said other two pairs of said springs which are arranged with one spring of each pair above the other, the springs being held by the jack means each in precompression between the beam member and a common lug on the frame, said two of said pairs of springs being arranged with the springs of each pair disposed one above the other and held in precompression by the jack means between the beam member and a lug on the motor casing constituting part of the motor nose.

50. In a railway vehicle having an electric, axle hung, traction motor a nose suspension for the motor according to claim 33 wherein the beam member is in two parts constituting respectively the abutments for the springs of each of said pairs of springs with the beam member, the beam member parts being disposed respectively one above and one below said pairs of springs and the beam member incorporating jack means holding the beam member parts drawn together the beam member being disposed horizontally and transversely of the vehicle and being supported from a frame of the vehicle by said two pairs of said rubber springs, the springs of each pair being disposed one above the other and held by the jack means in precompression between the beam member and a common lug on the frame of the vehicle, said one joint connection element embracing an inner complementary element on the motor casing constituting the motor nose.

51. In a railway vehicle, a nose suspension as claimed in claim 50 wherein said one joint connection element is a rubber bearing which is in two parts carried respectively by the two parts of the beam member and the jack means holds the bearing parts in precompression against the motor nose.

52. In a railway vehicle having an electric, axle hung, traction motor a nose suspension for the motor according to claim 34 wherein the beam member is in two parts constituting respectively the abutments for the springs of each of said pairs of springs with the beam member, the beam member parts being disposed respectively one above and one below said pairs of springs and the beam member incorporating jack means holding the beam member parts drawn together the beam member being disposed horizontally and transversely of the vehicle and said one joint connection comprising a rubber bearing in two parts carried respectively by the two parts of the beam member and held by the jack means embracing an inner complementary element on a frame of the vehicle, said two pairs of rubber springs being arranged with the springs of each pair disposed one above the other and held in precompression by the jack means between the beam member and a lug on the motor casing constituting part of the motor nose.

53. In a railway vehicle having an electric, axle hung, traction motor, a nose suspension for the motor according to claim 35 wherein the beam member is in two parts constituting respectively the abutments for the springs of each of said pairs of springs with the beam member, the beam member parts being disposed respectively one above and one below said pairs of springs and the beam member incorporating jack means holding the beam member parts drawn together the beam member being disposed horizontally and transversely of the vehicle and supported by a pair of transversely spaced lugs on a frame of the vehicle against which its parts are directly and fixedly clamped by the jack means, said two pairs of said rubber springs being arranged with one spring of each pair above the other, the springs being held by the jack means each in precompression between the beam member and a common lug on the motor casing constituting the motor nose.

54. In a railway vehicle having an electric, axle hung traction motor, a nose suspension for the motor according to claim 36 wherein the beam member is in two parts constituting respectively the abutments for the springs of each said pairs of springs with the beam member, the beam member parts being disposed respectively one above and one below said pairs of springs and the beam member incorporating jack means holding the beam member parts drawn together the beam member being disposed horizontally and transversely of the vehicle and supported from a frame of the vehicle by said two pairs of said rubber springs which are arranged with one spring of each pair above the other, the springs being held by the jack means each in precompression between the beam member and a common lug on the frame, the jack means clamping the beam member parts directly and fixedly against a transversely spaced pair of lugs on the motor casing the casing lugs constituting the motor nose.

55. In a railway vehicle, a nose suspension for an axle hung traction motor as claimed in claim 44 wherein the brackets on the vehicle frame and the motor nose lugs together define a horizontal, transversely disposed through-way into and from which the suspension may be introduced and withdrawn by horizontal transverse movement.

56. In a railway vehicle, a nose suspension for an axle hung traction motor as claimed in claim 45 wherein the brackets on the vehicle frame and the motor nose lugs together define a horizontal, transversely disposed through-way into and from which the suspension may be introduced and withdrawn by horizontal transverse movement.

57. In a railway vehicle, a nose suspension for an axle hung traction motor as claimed in claim 46 wherein the brackets on the vehicle frame and motor nose lugs together define a horizontal, transversely disposed through-way into and from which the suspension may be introduced and withdrawn by horizontal transverse movement.

References Cited by the Examiner

UNITED STATES PATENTS

| | | | |
|---|---|---|---|
| 2,196,406 | 4/1940 | Alben | 105—139 |
| 2,227,136 | 12/1940 | Hopper | 105—113 |
| 2,248,869 | 7/1941 | Harwick | 105—139 |
| 2,508,139 | 5/1950 | Binney | 105—132.1 |
| 2,811,113 | 10/1957 | Short | 105—132.1 |

ARTHUR L. LA POINT, *Primary Examiner.*

B. FAUST, *Assistant Examiner.*